(12) United States Patent
Fujita (10) Patent No.: US 7,978,172 B2
(45) Date of Patent: Jul. 12, 2011

(54) SWITCHING DEVICE AND SWITCHING METHODS OF THE SAME

(75) Inventor: Kenichi Fujita, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 1145 days.

(21) Appl. No.: 11/012,238

(22) Filed: Dec. 16, 2004

(65) Prior Publication Data

US 2005/0190148 A1 Sep. 1, 2005

(30) Foreign Application Priority Data

Dec. 19, 2003 (JP) .................................. 2003-423031

(51) Int. Cl.
G09G 5/00 (2006.01)
(52) U.S. Cl. ........ 345/156; 709/217; 709/218; 709/219; 715/700; 715/764; 715/778; 715/856; 715/862
(58) Field of Classification Search ............ 345/1.1–3.3, 345/156–167; 709/217–219; 715/700, 764, 715/778, 856, 862
See application file for complete search history.

(56) References Cited

U.S. PATENT DOCUMENTS

| | | | | |
|---|---|---|---|---|
| 5,367,631 | A * | 11/1994 | Levy ............................ | 345/163 |
| 5,499,334 | A * | 3/1996 | Staab .......................... | 715/778 |
| 5,564,002 | A * | 10/1996 | Brown ......................... | 715/778 |
| 7,010,755 | B2 * | 3/2006 | Anderson et al. ............. | 715/778 |
| 2002/0067347 | A1 | 6/2002 | Maezawa et al. | |
| 2003/0088635 | A1 * | 5/2003 | Chen ............................ | 709/208 |
| 2003/0217123 | A1 * | 11/2003 | Anderson et al. ............. | 709/219 |
| 2004/0017355 | A1 * | 1/2004 | Shim ............................ | 345/157 |
| 2005/0125739 | A1 * | 6/2005 | Thompson et al. ........... | 715/778 |

FOREIGN PATENT DOCUMENTS

| | | |
|---|---|---|
| EP | 0 172 433 | 2/1986 |
| JP | 61-42686 | 3/1986 |
| JP | 2-196295 | 8/1990 |
| JP | 8-307786 | 11/1996 |
| JP | 9-305301 | 11/1997 |
| JP | 10-97383 | 4/1998 |
| JP | 10-301753 | 11/1998 |
| JP | 11-31064 | 2/1999 |
| JP | 2001-51801 | 2/2001 |
| JP | 2002-41438 | 2/2002 |
| JP | 2002-123369 | 4/2002 |
| JP | 2002-162956 | 6/2002 |
| JP | 2002-189542 | 7/2002 |

OTHER PUBLICATIONS

Communication from the Japanese Patent Office mailed on Jan. 19, 2010 in the related Japanese patent application No. 2003-423031.

* cited by examiner

*Primary Examiner* — Sumati Lefkowitz
*Assistant Examiner* — Robert E Carter, III
(74) *Attorney, Agent, or Firm* — Staas & Halsey LLP (57) ABSTRACT

A switching device that selectively changes a computer to be operated from multiple computers including a control unit that the control unit detects a cursor position on the computer to be operated based on coordinate data and a computer resolution of the computer to be operated, the coordinate data being generated by performing a same acceleration process as the computer to be operated, on relative coordinate data that has been acquired from a given pointing device, and the control unit selectively changing changes the computer to be operated according to the cursor position. It is thus possible to selectively change the computer to be operated without any dedicated software or requiring a given space for manipulation.

2 Claims, 7 Drawing Sheets

SWITCHING DETERMINATION AMOUNT

FIG. 3B

COMPUTER A

COMPUTER B

COMPUTER A

FIG. 7B

COMPUTER B

FIG. 8A

COMPUTER A

FIG. 8B

COMPUTER B

FIG. 9A

COMPUTER A

FIG. 9B

COMPUTER B

FIG. 10

SWITCHING DEVICE AND SWITCHING METHODS OF THE SAME

BACKGROUND OF THE INVENTION

1. Field of the Invention

This invention generally relates to a switching device and switching methods of the same.

2. Description of the Related Art

Conventionally, the switching devices have been proposed to control multiple computers with a set of keyboard, mouse, and display, or a set of keyboard, mouse, and multiple displays. With the above-mentioned switching device, a switching key or a hot key was used in the case where the switching was performed with hardware. Because, there is the problem in that it is impossible to conduct the switching with software, when the computer is off or while an operating system (OS) is being started or ended. Conventional techniques have been proposed as follows so as to solve the aforementioned problem.

A switching device described in Japanese Patent Application Publication No. 11-31064 (hereinafter referred to as Document 1) is equipped with a storage unit that stores common coordinates, and selectively changes a target when mouse coordinates reach an edge of a common coordinate system. A switching device described in Japanese Patent Application Publication No. 2002-41438 (hereinafter referred to as Document 2) selectively changes the computer based on display information of a cursor that is displayed on the screen and the screen size information.

A switching device described in Japanese Patent Application Publication No. 09-305301 (hereinafter referred to as Document 3) selectively changes the computer to be controlled when the mouse movement speed or accelerated speed exceeds a given threshold value. A switching device described in Japanese Patent Application Publication No. 2002-189542 (hereinafter referred to as Document 4) switches to another computer when the cursor moves to the outside of the screen size on the display.

The switching device disclosed in Document 1 has the common coordinate system, and it is to be noted that a moving range of the mouse is limited to the common coordinate system. There is a problem in that a certain area for manipulation is required on the desk or the like.

The switching device disclosed in Document 2 selectively changes the computer based on the display information of the cursor and the screen size information. However, a dedicated device driver is required for detecting the screen edge. Therefore, there is a problem in that this dedicated device driver needs to be installed on every OS of the computer, and in addition, the computer is overloaded more or less.

The switching device disclosed in Document 3 also requires a certain area for manipulation on the desk or the like, as in the switching device disclosed in Document 1. The switching device disclosed in Document 4 also requires a certain area for manipulation on the desk or the like, as in the switching device disclosed in Document 1.

SUMMARY OF THE INVENTION

The present invention has been made in view of the above circumstances and has a general object of the present invention to provide a switching device and switching methods of the same. With the switching device and the switching methods, it is possible to change the computer to be operated without any dedicated software or without requiring a certain area for manipulation on the desk or the like.

According to an aspect of the present invention, preferably, there is provided a switching device that selectively changes a computer to be operated from multiple computers including a control unit that detects a cursor position on the computer to be operated based on coordinate data and a computer resolution of the computer to be operated, the coordinate data being generated by performing a same acceleration process as the computer to be operated, on relative coordinate data that has been acquired from a given pointing device, and the control unit selectively changing the computer to be operated according to the cursor position.

The computer to be operated may be switched by detecting the cursor position on the computer to be operated, based on the relative coordinate data and the computer resolution of the computer to be operated. On the relative coordinate data, the acceleration process has been conducted. It is thus possible to switch the computer to be operated without installing any dedicated software. A large operation space is not required on the desk or the like, since the relative coordinate data output from the pointing device is employed, which is different from the case where the absolute coordinates are used.

According to another aspect of the present invention, preferably, there is provided a switching device that selectively changes a computer to be operated from multiple computers including a control unit that detects a cursor position on the computer to be operated based on coordinate data and a predicted computer resolution, the coordinate data being generated by performing a same acceleration process as the computer to be operated, on relative coordinate data that has been acquired from a given pointing device, and the predicted computer resolution being greater than a real computer resolution of the computer to be operated, and the control unit selectively changing the computer to be operated according to the cursor position.

The computer to be operated is switched by detecting the cursor position on the computer to be operated, based on the relative coordinate data and the predicted computer resolution of the computer to be operated. On the relative coordinate data, the acceleration process has been conducted. The predicted computer resolution is greater than a real computer resolution of the computer to be operated. Even if it is impossible to acquire the resolution of the computer to be operated, it is thus possible to switch the computer to be operated without installing any dedicated software. A large operation space is not required on the desk or the like, since the relative coordinate data output from the pointing device is employed, which is different from the case where the absolute coordinates are used.

In the above-mentioned switching device, preferably, the switching device that selectively changes a computer to be operated from multiple computers, and the control unit detects a display screen edge. By detecting the display screen edge of the computer to be operated, it is possible to provide a user-friendly switching device.

According to another aspect of the present invention, preferably, there is provided a switching device that selectively changes a computer to be operated from multiple computers including a control unit that detects a display screen edge based on absolute coordinates converted from relative coordinate data that has been acquired from a given pointing device, and the control unit selectively changes the computer to be operated if the pointing device exceeds the display screen edge and moves a given amount, based on the absolute coordinates acquired from the pointing device after the display screen edge is detected.

The absolute coordinates are sent to the computer, and the switching is performed based on the relative coordinate data received from the pointing device. It is thus possible to display the mouse cursor continuously without stopping sending the data of the pointing device such as keyboard or mouse, even if the switching is made. The user is able to work smoothly with the display that is connected to the switching device.

In the above-mentioned switching, preferably, a cursor is displayed at a position on a screen of the computer to be operated after selectively changing the computer as if the cursor were continuously moving from another computer before selectively changing the computer, based on the absolute coordinates that have been sent to said another computer before selectively changing the computer. It is thus possible for the user to work smoothly, since the user can see the cursor as if it were continuously moving.

According to another aspect of the present invention, preferably, there is provided a switching device that selectively changes a computer to be operated from multiple computers including a control unit that determines whether the computer to be operated is equipped with GUI capabilities, and the control unit assigns a switching function of the computer to be operated to a given movement of a pointing device, in a case where the computer to be operated has the GUI capabilities. It is thus possible to switch the computer to be operated by moving the pointing device to the left or right.

According to another aspect of the present invention, preferably, there is provided a switching method of a switching device including the steps of detecting a cursor position on a computer to be operated based on coordinate data and a computer resolution of the computer to be operated, the coordinate data being generated by performing a same acceleration process as the computer to be operated on relative coordinate data that has been acquired from a given pointing device, and selectively changing the computer to be operated according to the cursor position.

The computer to be operated may be switched with the switching method of detecting the cursor position on the computer to be operated, based on the relative coordinate data and the computer resolution of the computer to be operated. On the relative coordinate data, the acceleration process has been conducted. It is thus possible to switch the computer to be operated without installing any dedicated software. A large operation space is not required on the desk or the like, since the relative coordinate data output from the pointing device is employed, which is different from the case where the absolute coordinates are used.

According to another aspect of the present invention, preferably, there is provided a switching method of a switching device including the steps of detecting a cursor position on a computer to be operated based on coordinate data and a predicted computer resolution, the coordinate data being generated by performing a same acceleration process as the computer to be operated on relative coordinate data that has been acquired from a given pointing device, and the predicted computer resolution being greater than a real computer resolution of the computer to be operated, and selectively changing the computer to be operated according to the cursor position.

The computer to be operated may be switched with the switching method of detecting the cursor position on the computer to be operated, based on the relative coordinate data and the predicted computer resolution of the computer to be operated. On the relative coordinate data, the acceleration process has been conducted. The predicted computer resolution is greater than a real computer resolution of the computer to be operated. Even if it is impossible to acquire the resolution of the computer to be operated, it is thus possible to switch the computer to be operated without installing any dedicated software. A large operation space is not required on the desk or the like, since the relative coordinate data output from the pointing device is employed, which is different from the case where the absolute coordinates are used.

In the above-mentioned switching, preferably, the step of detecting detects a display screen edge. By detecting the display screen edge of the computer to be operated, it is possible to provide a user-friendly switching device.

According to another aspect of the present invention, preferably, there is provided a switching method of a switching device including the steps of detecting a display screen edge based on absolute coordinates converted from relative coordinate data that has been acquired from a given pointing device, and selectively changing a computer to be operated if the pointing device exceeds the display screen edge and moves a given amount, based on the absolute coordinates acquired from the pointing device after the display screen edge is detected.

The absolute coordinates are sent to the computer, and the switching is performed based on the relative coordinate data received from the pointing device. It is thus possible to display the mouse cursor continuously without stopping sending the data of the pointing device such as keyboard or mouse, even if the switching is made. The user is able to work smoothly with the display that is connected to the switching device.

In the above-mentioned switching, preferably, in the switching step, a cursor is displayed at a position on a screen of the computer to be operated after selectively changing the computer as if the cursor were continuously moving from another computer before selectively changing the computer, based on the absolute coordinates that have been sent to said another computer before selectively changing the computer. It is thus possible for the user to work smoothly, since the user can see the cursor as if it were continuously moving.

According to another aspect of the present invention, preferably, there is provided a switching method of a switching device including the steps of determining whether a computer to be operated is equipped with GUI capabilities, and assigning a switching function of the computer to be operated to a given movement of a pointing device, in a case where the computer to be operated has the GUI capabilities. It is thus possible to switch the computer to be operated by moving the pointing device to the left or right.

BRIEF DESCRIPTION OF THE DRAWINGS

Preferred embodiments of the present invention will be described in detail with reference to the following drawings, wherein.

DESCRIPTION OF THE PREFERRED EMBODIMENTS

A description will now be given, with reference to the accompanying drawings, of embodiments of the present invention.

First Embodiment

Figure 1:
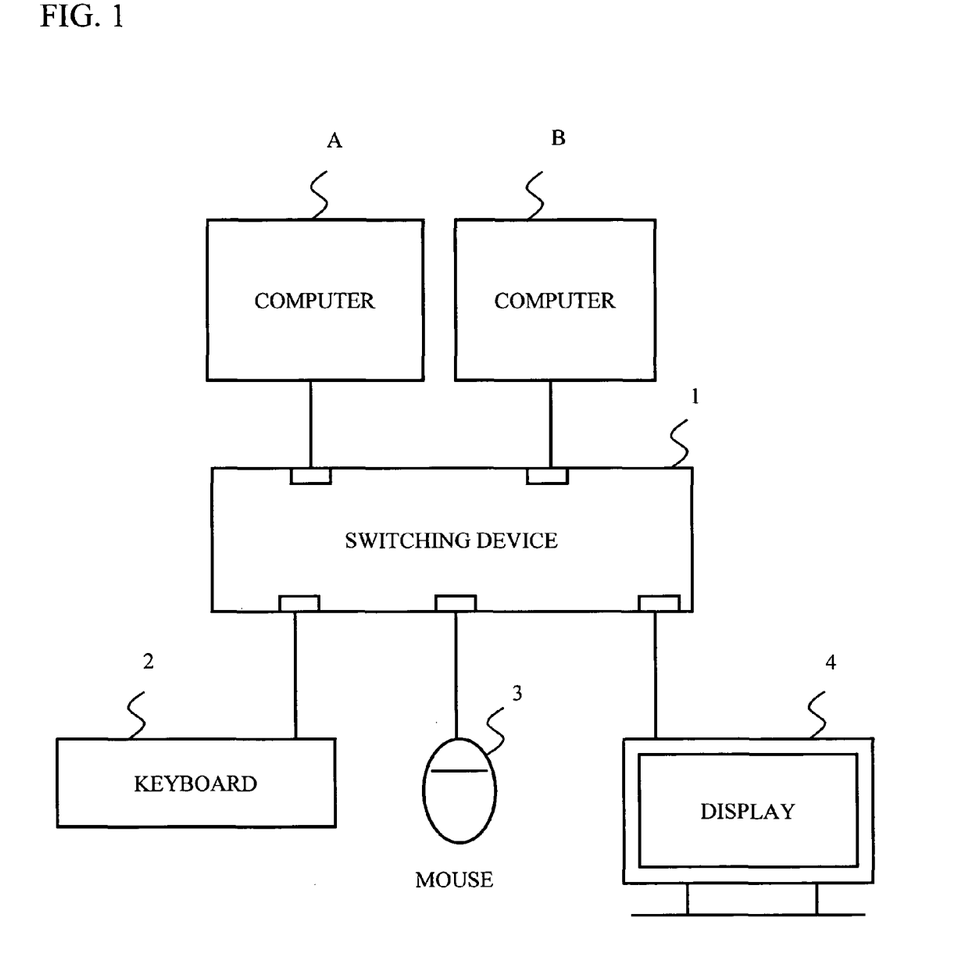
FIG. 1 shows a connection example of a switching device in accordance with a first embodiment of the present invention.

FIG. 1 shows a connection example of a switching device in accordance with a first embodiment of the present invention. Referring to FIG. 1, computers A and B, a keyboard 2 and a mouse 3 for manipulation, and a display 4 are connected to the switching device 1 via given connection terminals. The switching device 1 selects the computer to be operated from multiple computers, and selectively changes to the computer to be operated. An operator is able to operate the computers A and B, while watching the display 4 and switching between the computers A and B, with the use of a set of the mouse 3 and the keyboard 2.

Figure 2:
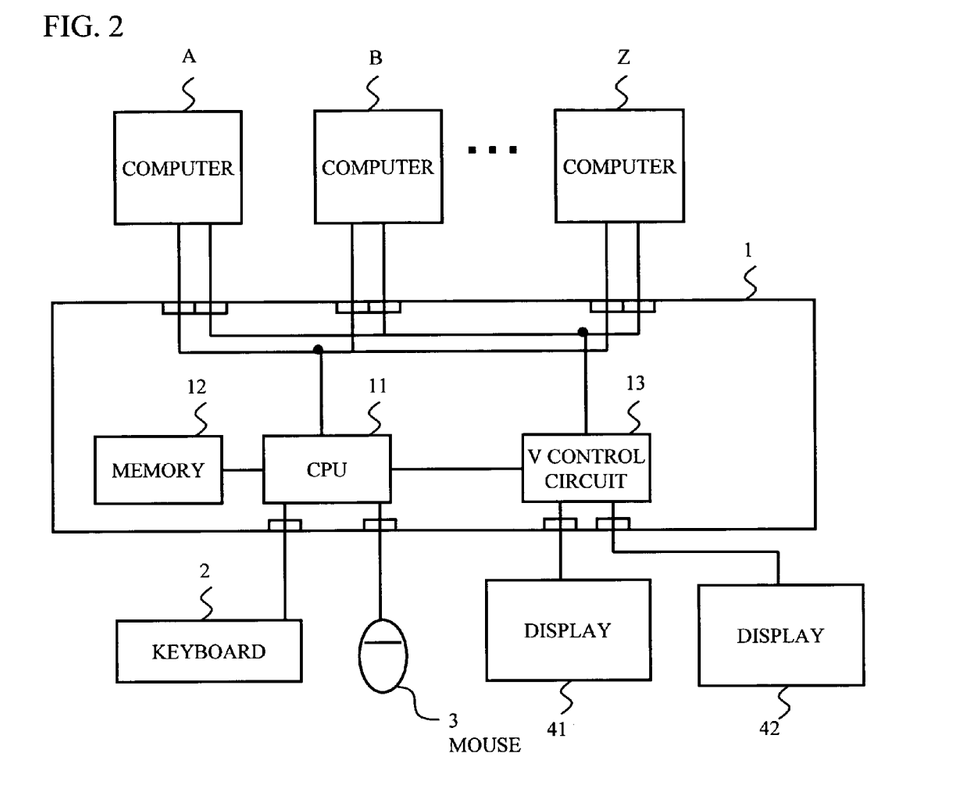
FIG. 2 is a block diagram of the switching device and another connection example of the switching device.

FIG. 2 shows a block diagram of the switching device and another connection example of the switching device. Referring to FIG. 2, multiple computers, that is, at least two computers are connected to the switching device 1, and two displays are connected, too. As shown in FIG. 2, the switching device 1 includes a CPU 11, a memory 12, and a V control circuit 13. Also in FIG. 2, a reference numeral 2 denotes the keyboard, 41 and 42 denote displays, and A through Z show the computers to be operated. A description will be given with the mouse that is used for a pointing device.

The CPU 11 controls the whole switching device 1 according to a given program. The CPU 11 detects a position of the cursor on the computer to be operated based on coordinate data and a resolution of the computer to be operated. The coordinate data is obtained by performing the same acceleration process as the computer to be operated on relative coordinate data obtained by the mouse 3. Then, the CPU 11 selectively changes to the computer to be operated according to the position of the cursor. The CPU 11 corresponds to a control unit.

The memory 12 is composed of a RAM (Random Access Memory), for example, and stores programs and various types of data. A switching determination amount is stored in the memory 12. The switching determination amount is variable according to the resolution. The switching determination amount, which does not exist on absolute coordinates, is a simple numeric value so as to be compared with the relative coordinate data that is received from the mouse 3. It is possible to set the switching determination amount to be five percent greater than the resolution, for example. The V control circuit 13 controls video signals outputted from the computers A through Z to the displays 41 and 42. The V control circuit 13 acquires the resolution from the video signals of the respective computers.

Figure 3A:
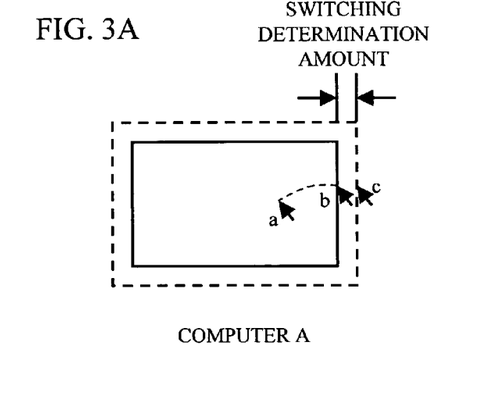
FIG. 3A illustrates a mouse cursor position before switching.
Figure 3B:
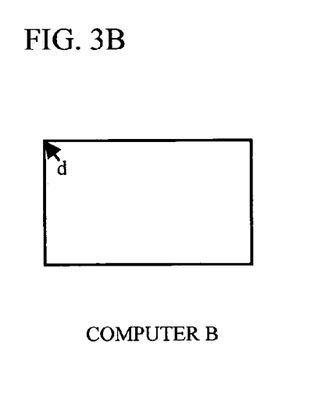
FIG. 3B illustrates the mouse cursor position after switching.

Next, a description will be given of a switching operation for the computers to be operated. FIG. 3A shows the position of a mouse cursor before switching. FIG. 3B shows the position of the mouse cursor after switching. Referring to FIGS. 3A and 3B, when the mouse cursor moves to a display screen edge b from a home position a, exceeds a switching determination amount H, and further moves to a position c, the CPU 11 changes the computer to be operated from the computer A to the computer B. After the CPU 11 changes the computer to be operated from the computer A to the computer B, the CPU 11 displays the mouse cursor at an upper-left edge d of the display screen.

Figure 4:
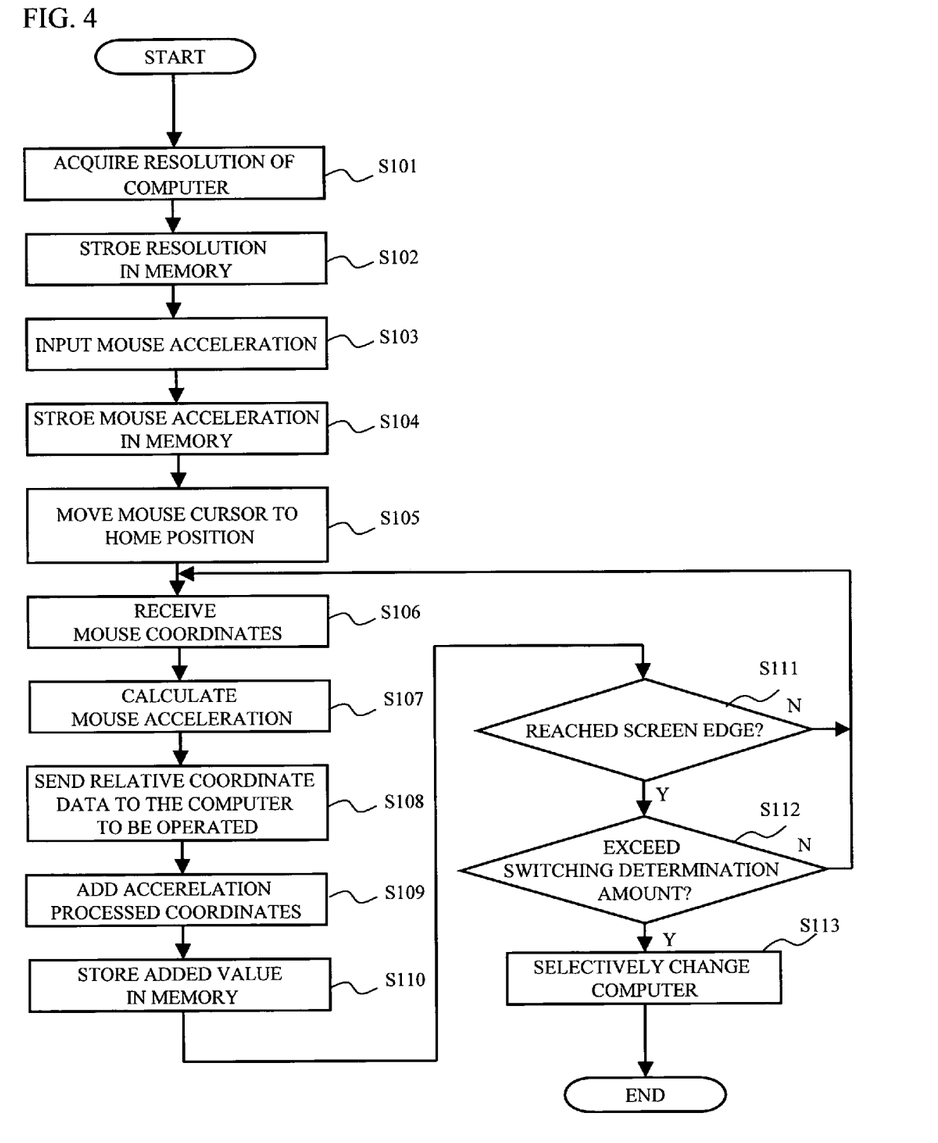
FIG. 4 is a flowchart describing an operation of the switching device in accordance with the first embodiment of the present invention.

Next, a description will be given of an operation of the switching device. FIG. 4 is a flowchart describing the operation of the switching device in accordance with the first embodiment of the present invention. The switching process is performed with the relative coordinate data in accordance with the first embodiment of the present invention. A description will be given of the switching device 1 on the assumption that the computer A has been selected for the computer to be operated. In step S101, the V control circuit 13 acquires the resolution from the video signals of the computer A. In step S102, the CPU 11 stores the resolution of the computer A in the memory 12.

Then, in step S103, the CPU 11 inputs a mouse acceleration setting to the switching device 1. The mouse acceleration setting has been set in the OS of the computer A. In step S104, the CPU 11 stores the mouse acceleration setting in the memory 12. The mouse acceleration setting may be selected from registered initial values of the mouse acceleration, which have been registered in the switching device 1 in advance as initial values of typical operating systems. The switching device 1 may include setting items same as those in the OS so that a user may set up with dialog boxes displayed on the displays 41 and 42.

In step S105, the CPU 11 sends to the computer A, the amount of mouse movement in X and Y directions as large as the acquired resolution, moves the cursor to the home position, which is a position a shown in FIG. 3, and matches the position of the mouse cursor on the screen with the mouse coordinates in the switching device 1. In step S106, the CPU 11 receives the relative coordinate data from the mouse 3 according to the user's mouse manipulation. In step S107, the CPU 11 calculates the mouse acceleration after the acceleration process is performed based on the mouse acceleration setting. In step S108, the CPU 11 sends the relative coordinate data to the computer A without change. In step S109, the CPU 11 adds the coordinate data that the acceleration process has been performed on the home position a. In step S110, the CPU 11 stores the added value of the coordinate data on which the acceleration process has been performed, in the memory 12.

In step S111, the CPU 11 calculates the current position of the mouse cursor on the computer A, with the added value of the coordinate data on which the acceleration process has been performed and the resolution of the computer A, and determines whether the mouse cursor has reached the screen edge that is indicated by the resolution of the computer. If the mouse cursor has not reached the screen edge, return to step S106. If the mouse cursor has reached the screen edge, go to step S112.

In step S112, if the CPU 11 receives the relative coordinate data from the mouse 3 that is moving toward the outside of the screen, the CPU 11 compares the amount of mouse movement that exceeds the screen edge (the relative coordinate data received from the mouse) with the given switching determination amount H that is stored in the memory 12. If the amount of mouse movement does not exceed the switching determination amount H, return to step S106. If the amount of mouse movement exceeds the switching determination amount H, go to step S113 and the CPU 11 changes the computer to be operated from the computer A to the computer B. Thus, as shown in FIG. 3B, the mouse cursor is shown at the upper-left edge of the display screen. However, in the case where the mouse acceleration setting cannot be acquired in step S103, the absolute amount of mouse movement that is necessary for the switching may be set in the memory 12 in advance. If the mouse movement exceeds the absolute amount, the computer to be operated may be changed.

The relative coordinate data, which is received from the mouse 3, is used in accordance with the first embodiment of the present invention. Thus, there is no limitation on the manipulation space on the desk, which is same as ever. It is possible to change the computer to be operated by manipulating the mouse normally. In addition, it is possible to detect a switching condition inside the switching device 1, and thereby to selectively change the computer to be operated without using any special software. Further, it is also possible to switch without operating any switching button or any hot key.

Second Embodiment

Figure 5A:
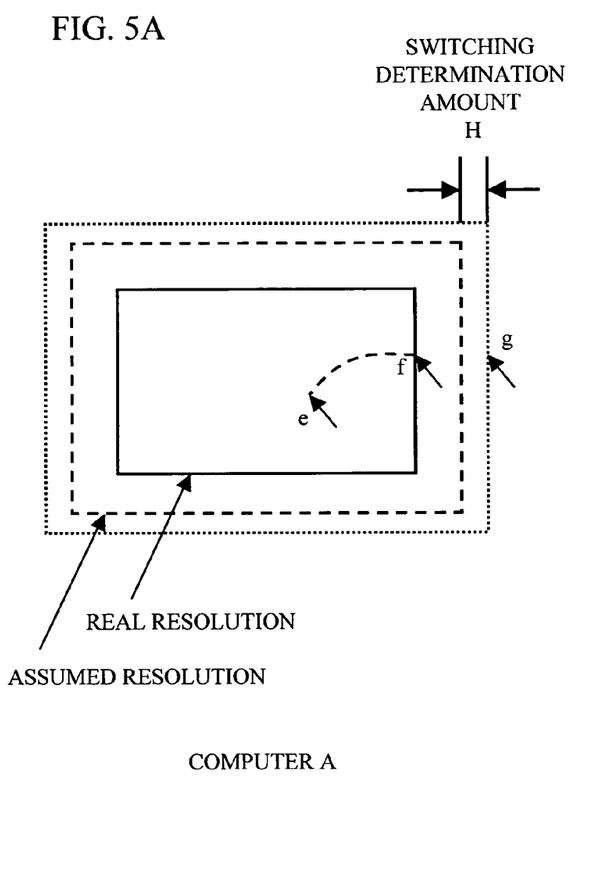
FIG. 5A illustrates the mouse cursor position before switching.
Figure 5B:
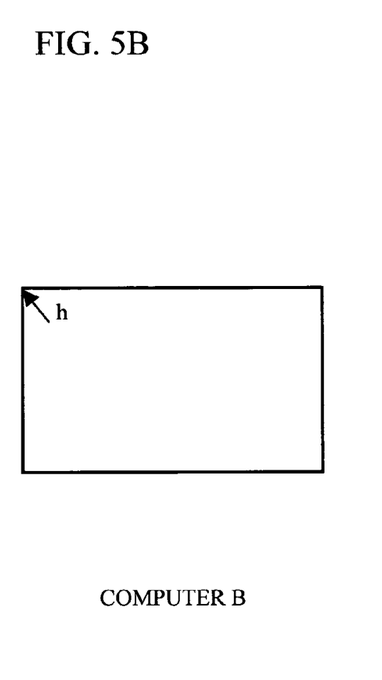
FIG. 5B illustrates the mouse cursor position after switching.

Next, a description will be given of a second embodiment of the present invention. The switching device in accordance with the second embodiment of the present invention has the same configuration as that of the first embodiment of the present invention. Therefore, a description will be given with FIG. 2. FIG. 5 shows a switching operation of the switching device so as to selectively change the computer to be operated in accordance with the second embodiment of the present invention. FIG. 5A illustrates a position of a mouse cursor before switching. FIG. 5B illustrates a position of the mouse cursor after switching. In the case where the resolution is uncertain since the resolution cannot be acquired from the video signals, a predicted resolution that is sufficiently greater than the real resolution, for example, QXGA (Quad XGA (extended Graphics Array)) is assumed as shown in FIG. 5.

In the case where the CPU 11 detects that the mouse cursor moves from a home position e to the screen edge f that corresponds to the real resolution, and the mouse cursor further exceeds the switching determination amount H from the screen edge that corresponds to the predicted resolution, the CPU 11 changes the computer to be operated from the computer A to the computer B. The CPU 11 displays the mouse cursor at an upper-left edge h of the display screen.

In accordance with the second embodiment of the present invention, the CPU 11 detects the position of the cursor on the computer to be operated based on the coordinate data and the predicted resolution. The coordinate data is obtained by performing the acceleration process same as the computer to be operated on the relative coordinate data acquired from the mouse 3. The predicted resolution is greater than the real resolution of the computer to be operated. Then, the CPU 11 selectively changes the computer to be operated according to the position of the cursor. Thus, even if it is not possible to acquire the resolution of the computer to be operated, it is possible to switch the computer to be operated.

Third Embodiment

Next, a description will be given of the switching device in accordance with a third embodiment of the present invention. In accordance with the third embodiment of the present invention, the relative coordinate data is converted into absolute coordinate data. The absolute coordinate data is used for displaying the mouse cursor, and the relative coordinates are used for selectively changing the computer. The switching device in accordance with the third embodiment of the present invention has the same configuration as that of the first embodiment of the present invention. Therefore, a description will be given with FIG. 2.

Figure 6:
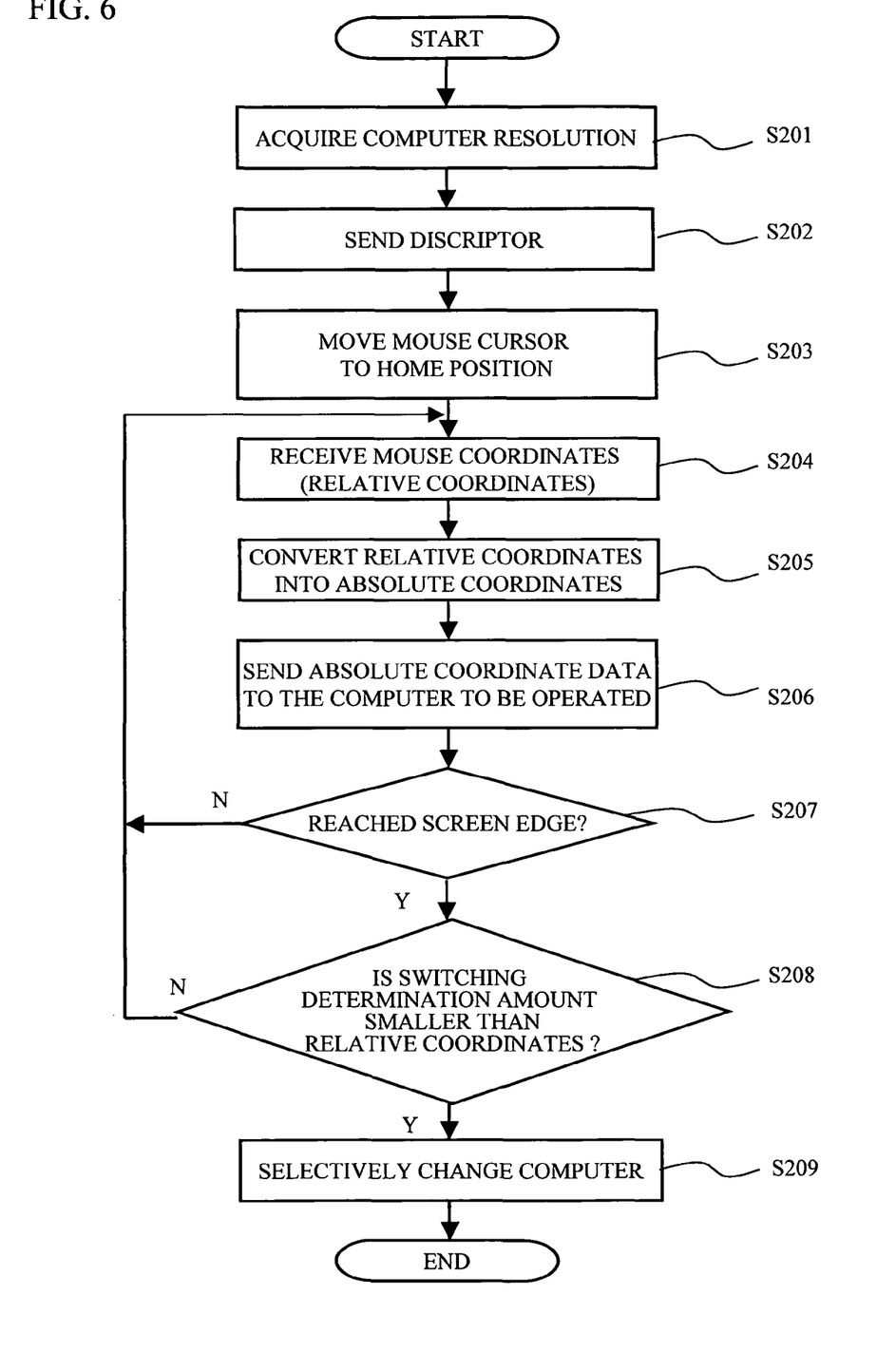
FIG. 6 is a flowchart describing operations of the switching device in accordance with a third embodiment of the present invention.

FIG. 6 is a flowchart describing an operation of the switching device in accordance with the third embodiment of the present invention. A description will be given on the assumption that the switching device 1 selects the computer A as the computer to be operated. In step S201, the V control circuit 13 acquires the resolution from the video signals of the computer A. The CPU 11 stores the resolution in the memory 12. In step S202, the CPU 11 sends a descriptor as an absolute value device to the computer A.

The OS of the computer A loads a USB driver used for the absolute value device. The OS comes equipped with the USB driver. Then, the OS realizes the mouse data from the switching device 1 as the absolute value, and starts operating. In step S203, the CPU 11 moves the mouse cursor of the computer A to the home position. Here, how to move the mouse cursor is to send the amount of mouse movement in the X and Y directions as large as the acquired resolution, from the switching device 1 to the computer A. In step S204, the CPU 11 receives the relative coordinate data from the mouse 3 following the user's mouse manipulation.

In step S205, the CPU 11 converts relative coordinate data acquired from the mouse 3 into the absolute coordinate data. In step S206, the CPU 11 sends the absolute coordinate data to the computer A. In step S207, the CPU 11 determines whether the mouse cursor has reached the screen edge. If the mouse cursor has reached the screen edge, go to step S208. If the mouse cursor has not reached the screen edge, return to step S204. The CPU 11 determines that the mouse cursor has reached the screen edge when the absolute coordinate data receives the relative coordinate data from the mouse 3. The absolute coordinate data is sent to the computer A. The relative coordinate data makes the mouse cursor move in the direction smaller than the minimum of the absolute coordinate value and in the direction greater than the maximum of the absolute coordinate value.

In step S208, the CPU 11 determines whether the relative coordinate data is greater than the switching determination amount H. If the relative coordinate data is smaller than the switching determination amount H, return to step S209. If the relative coordinate data is greater than the switching determination amount H, go to step S209 and the CPU 11 changes the computer to be operated from the computer A to the computer B. The CPU 11 displays the cursor, according to the absolute coordinates sent to the computer A before switching, on the position that can show the cursor on the computer B, after switched from the computer A, as if the cursor were continuously moving from the computer A.

In the case where the resolution cannot be acquired in step S201, the absolute amount of mouse movement required for the switching may be stored in the memory 12. The computer to be operated may be switched, in the case where integrated relative coordinate data received from the mouse 3 exceeds the above-mentioned absolute amount.

In accordance with the third embodiment of the present invention, in the case where the resolution of the computer to be operated cannot be acquired, the CPU 11 detects the display screen edge of the computer to be operated based on the absolute coordinates converted from the relative coordinate value, which is acquired from the mouse 3. Then, the CPU 11 selectively changes the computer to be operated if the mouse 3 moves a given amount and exceeds the display screen edge based on the relative coordinate data acquired from the mouse 3. Thus, even if the computer to be operated is changed without stopping sending the data of the keyboard 2 or the mouse 3, the cursor can be shown as if the mouse cursor were continuously moving. Thus, the user is able to operate readily while watching the displays 41 and 42 that are connected to the switching device 1.

Fourth Embodiment

Figure 7A:
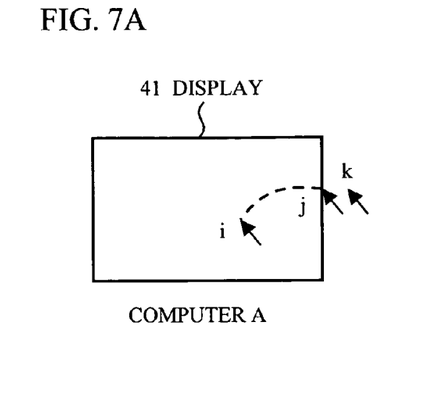
FIGS. 7A and 7B describe a mouse cursor movement in the case where one display is connected to the switching device.
Figure 7B:
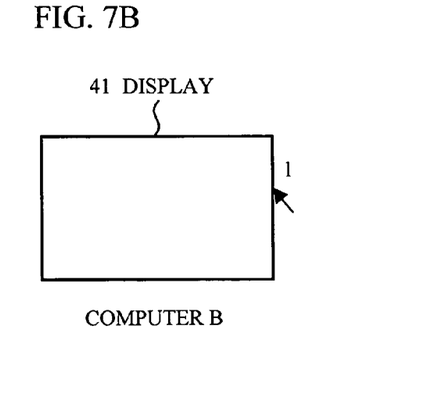
Figure 8A:
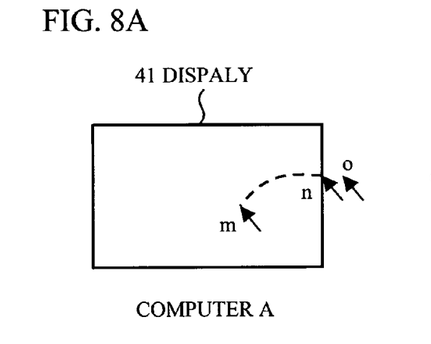
FIGS. 8A and 8B describe the mouse cursor movement in the case where two displays are connected to the switching device.
Figure 8B:
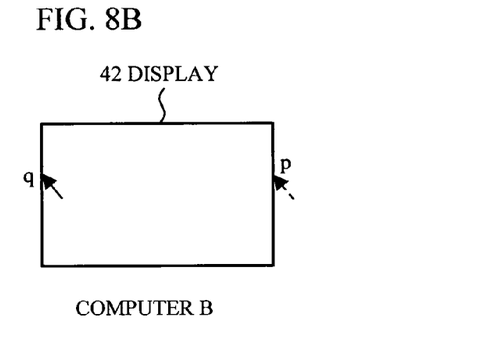
Figure 9A:
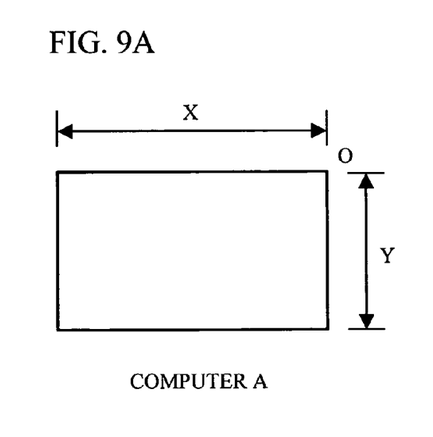
FIG. 9A illustrates a resolution of a computer A.
Figure 9B:
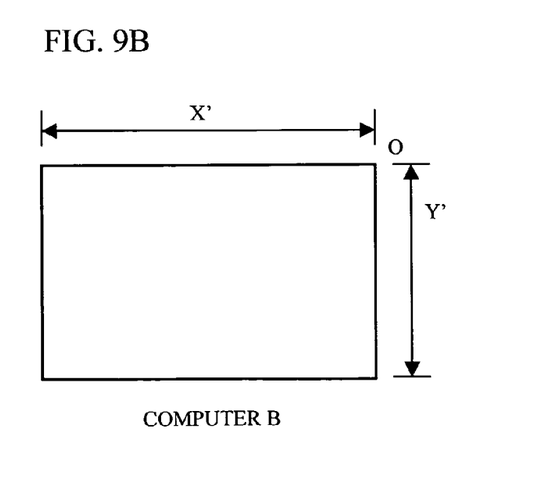
FIG. 9B illustrates the resolution of a computer B.

Next, a description will be given of a fourth embodiment of the present invention. The switching device 1 in accordance with the fourth embodiment of the present invention has the same configuration as that of the first embodiment of the present invention. A description will be given with FIG. 2. FIG. 7 illustrates a movement of the mouse cursor in the case where one display is connected to the switching device 1. FIG. 8 illustrates the movement of the mouse cursor in the case where two displays are connected to the switching device 1. FIG. 9 illustrates the resolution of the computer A and that of the computer B.

Referring to FIG. 9, the resolution of the computer A (before switching) is set to (X, Y). The resolution of the computer B (after switching) is set to (X', Y'). Referring back to FIG. 7, in the case where one display is connected to the switching device 1, the CPU 11 detects that the mouse cursor moves from a home position i to a screen display edge j, exceeds the switching determination amount H, and moves to a position k, the CPU 11 changes the computer to be operated from the computer A to the computer B, stores in the memory 12, the mouse cursor position j on the computer A before switching, and displays a mouse cursor position l on the computer B after switching, which is the same position as a mouse cursor position j on the computer A before switching. Thus, even if the computer to be operated is switched, a smooth display can be realized.

Referring back to FIG. 8, in the case where two displays are connected to the switching device 1, the CPU 11 detects that the mouse cursor moves to a display screen edge n from a home position m, exceeds the switching determination amount H, and moves to a position o, the CPU 11 changes the computer to be operated from the computer A to the computer B, stores in the memory 12, a mouse cursor position n on the computer A before switching, and displays the mouse cursor on a mouse cursor position q on the computer B after switching. The mouse cursor position q on the computer B corresponds to the mouse cursor n (the display screen edge n) on the computer A, which has horizontally flipped the position p. Thus, in the case where two displays are connected to the switching device 1, it is possible to move the mouse cursor continuously and thereby to display the cursor smoothly.

Figure 10:
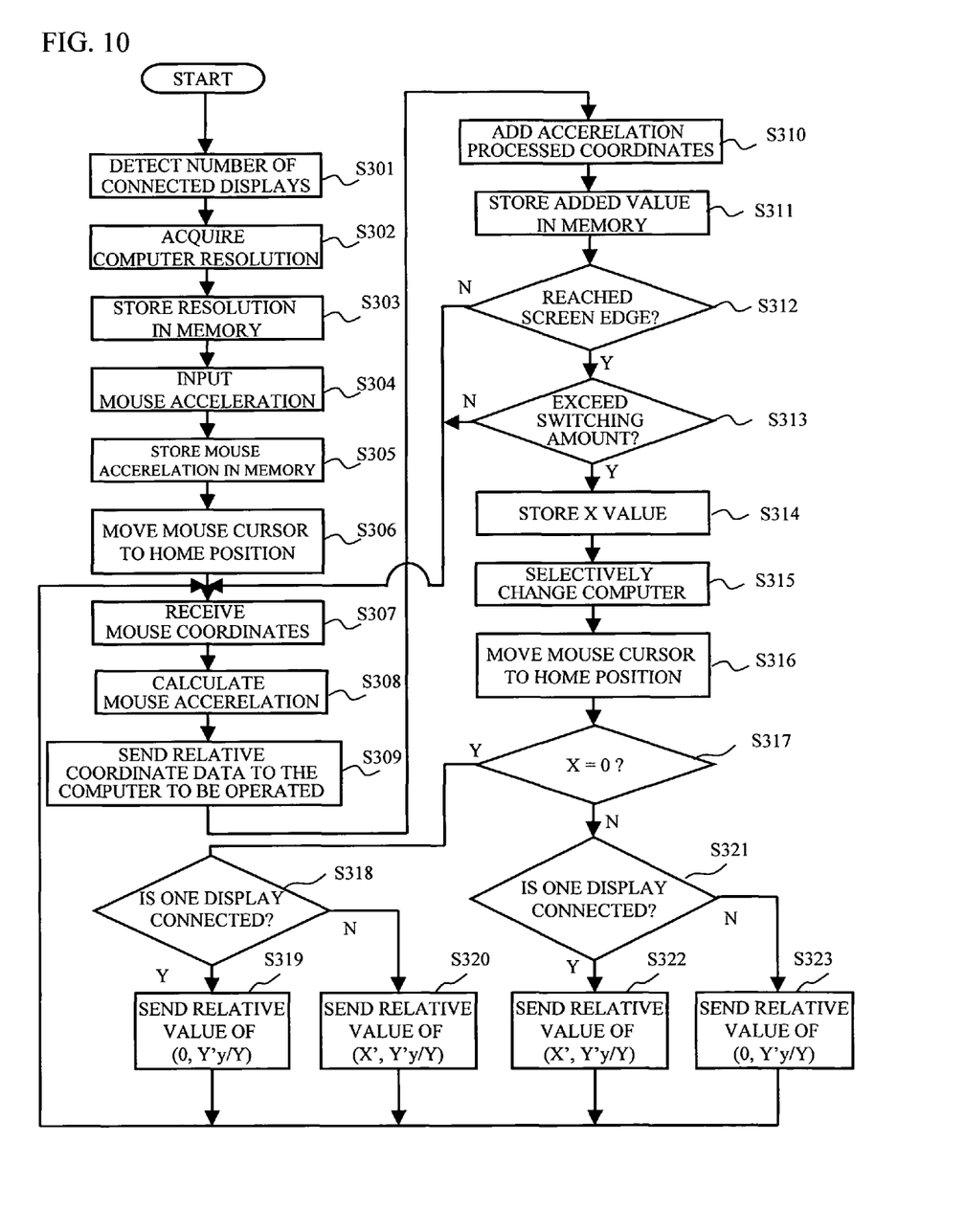
FIG. 10 is a flowchart describing the operations of the switching device in accordance with a fourth embodiment of the present invention.

Next, a description will be given of the switching device in accordance with the fourth embodiment of the present invention. FIG. 10 is a flowchart describing the operation of the switching device in accordance with the fourth embodiment of the present invention. In step S301, the CPU 11 detects the number of displays to be connected. In step S302, the V control circuit 13 acquires the resolution of the computer A. In step S303, the CPU 11 stores the resolution of the computer A in the memory 12. In step S304, the CPU 11 inputs the mouse acceleration setting that is set in the OS of the computer A.

In step S305, the CPU 11 stores the mouse acceleration setting in the memory 12. This mouse acceleration setting, which includes the mouse acceleration setting of a representative OS, may be registered in the switching device 1 in advance so as to be selected later. The switching device 1 may have the same setting items as the OS so that the user can configure with the dialog boxes shown on the displays 41 and 42.

In step S306, the CPU 11 sends to the computer A, the amount of mouse movement in the X and Y directions as large as the acquired resolution, and moves the mouse cursor to the home position so as to match the mouse cursor position with the mouse coordinates inside the switching device 1. In step S307, the CPU 11 receives the relative coordinate data from the mouse 3 based on the user's mouse manipulation. In step S308, the CPU 11 performs the acceleration process to calculate the mouse acceleration based on the mouse acceleration setting.

In step S309, the CPU 11 sends the relative coordinate data from the mouse 3 to the computer A without change. In step S310, the CPU 11 adds the coordinate data that the acceleration process has been performed on the home position a. In step S311, the CPU 11 stores the added value of the coordinate data on which the acceleration process has been performed, in the memory 12. In step S312, the CPU 11 calculates the current position of the mouse cursor on the computer A with the added value of the coordinate data on which the acceleration process has been performed and the resolution of the computer A, and determines whether the mouse cursor has reached the screen edge shown by the computer resolution. If the mouse cursor has not reached the screen edge, return to the step S307. If the mouse cursor has reached the screen edge, go to step S313.

In step S313, if the CPU 11 receives the relative coordinate data from the mouse 3 that is moving toward the outside of the screen, the CPU 11 compares the amount of mouse movement that exceed the screen edge and the given switching determination amount H that is stored in the memory 12. The amount of mouse movement that exceeds the screen edge is the relative coordinate data from the mouse. If the amount of mouse movement has not exceeded the switching determination amount H, return to step S307. If the amount of mouse movement has exceeded the switching determination amount H, go to step S314. In step S314, the CPU 11 stores an x value of the computer A before switching. In step S315, the CPU 11 selectively changes the computer to be operated from the computer A to the computer B.

In step S316, the CPU 11 moves the mouse cursor to the home position after changing the computer to be operated to the computer B. In step S317, if the x value that has been stored in the memory 12 is "0", which means that the mouse cursor before switching existed at the upper-left on the screen. Therefore, in step S318, if there is one display that is connected, the CPU 11 sends a value of the relative coordinates (0, Y'y/Y) to the computer B. Thus, as shown in FIG. 7B, after switching to the computer B, it is possible to move the mouse cursor to the position l on the computer B, which corresponds to the same position before switching.

In step S318, if there are more than one computer, for example, two computers, and in step S320, the CPU 11 sends the value of the relative coordinates (X', Y'y/Y) to the computer B. Thus, as shown in FIG. 8B, after switching to the computer B, it is possible to move the mouse cursor to the position q on the computer B, which has horizontally flipped the position p on the computer B.

In step S317, if the x value that has been stored in the memory 12 is not "0", which means that the mouse cursor before switching existed at an upper-right on the screen. Therefore, in step S321, if there is one display that is connected, the CPU 11 sends the value of the relative coordinates (X', Y'y/Y) to the computer. Thus, after switching to the computer B, it is possible to move the mouse cursor to the position, which corresponds to the same position before switching.

In step S321, if there are more than one computer, for example, two computers, and in step S323, the CPU 11 sends the relative coordinates of (0, Y'y/Y) to the computer B. Thus, after switching to the computer B, it is possible to move the mouse cursor to the position, which has horizontally flipped the position before switching.

Fifth Embodiment

Next, a description will be given of a fifth embodiment of the present invention. In accordance with the fifth embodiment of the present invention, the computer to be operated is equipped with the GUI capabilities. The switching device in accordance with the fifth embodiment of the present invention has the same configuration as that of the first embodiment of the present invention. Therefore, a description will be given with FIG. 2. Next, the operation will be described. The CPU 11 detects whether the computer to be operated is equipped with the GUI capabilities. In the case where the computer to be operated is equipped with the GUI capabilities, a switching function is assigned to a left or right movement of the mouse. Thus, the switching is performed by moving the pointing device such as a mouse. In this case, the GUI capabilities of the computer A to be operated may be detected by way of a cable that connects the computer A and the switching device 1. The computer equipped with the GUI capabilities may be registered in the switching device 1 in advance.

In accordance with the fifth embodiment of the present invention, the CPU 11 determines whether the computer to be operated is equipped with the GUI capabilities. If the computer to be operated is equipped with the GUI capabilities, the switching function of the computer to be operated is assigned to a given movement of the pointing device. For instance, in the case of using the keyboard equipped with a stick pointer, which is represented by the keyboard manufactured by IBM, it is possible to operate the stick pointer on the keyboard to left and right while typing the keyboard so as to switch the computer to be operated, and thereby manipulate the switching device in a convenient manner without removing the hands from the keyboard.

The present invention is not limited to the above-mentioned embodiments, and other embodiments, variations and modifications may be made without departing from the scope of the present invention.

The present invention is based on Japanese Patent Application No. 2003-423031 filed on Dec. 19, 2003, the entire disclosure of which is hereby incorporated by reference.

What is claimed is:

1. A switching device that selectively changes a computer to be operated from multiple computers connected to at least one display, the switching device comprising:
a control circuit configured to acquire a computer resolution of the computer to be operated from video signals of the computer to be operated;
a memory configured to store the acquired computer resolution; and
a control unit configured to input and store in the memory an acceleration setting of an input device used to move a cursor position of the computer to be operated, to move a cursor position of the computer to be operated to a predetermined position so that the cursor position coincides with coordinates that indicate the cursor position within the switching device, to receive relative coordinate data from the input device according to a manipulation of the input device, to calculate an acceleration of the input device based on the stored acceleration setting, to send the relative coordinate data to the computer to be operated without change, to add coordinate data that the acceleration has been performed on to the predetermined position and store the added value in the memory, to calculate a current cursor position on the computer to be operated based on the added value and the resolution of the computer to be operated and determine if the cursor has reached an edge of the at least one display that is indicated by the resolution of the computer to be operated, to compare an amount of input device movement that exceeds the edge with a predetermined switching determination amount stored in the memory when the cursor has reached an edge of the at least one display and the switching device receives the relative coordinate data from the input device that is moving toward an outside of the at least one display, and to selectively change the computer to be operated when the amount of input device movement that exceeds the edge exceeds the predetermined switching determination amount.

2. A switching method of a switching device that selectively changes a computer to be operated from multiple computers connected to at least one display, comprising:
acquiring a computer resolution of a computer to be operated from video signals of the computer to be operated;
storing the acquired computer resolution in a memory of the switching device;
inputting and storing in the memory an acceleration setting of an input device used to move a cursor position of the computer to be operated;
moving a cursor position of the computer to be operated to a predetermined position so that the cursor position coincides with coordinates that indicate the cursor position within the switching device;
receiving, in the switching device, relative coordinate data from the input device according to a manipulation of the input device;
calculating, in the switching device, an acceleration of the input device based on the stored acceleration setting;
sending the relative coordinate data to the computer to be operated without change;
adding coordinate data that the acceleration has been performed on to the predetermined position and storing the added value in the memory;
calculating a current cursor position on the computer to be operated based on the added value and the resolution of the computer to be operated and determining if the cursor has reached an edge of the at least one display that is indicated by the resolution of the computer to be operated;
when the cursor has reached an edge of the at least one display, if the switching device receives the relative coordinate data from the input device that is moving toward an outside of the at least one display, comparing an amount of input device movement that exceeds the edge with a predetermined switching determination amount stored in the memory; and
when the amount of input device movement that exceeds the edge exceeds the predetermined switching determination amount, selectively changing the computer to be operated.

* * * * *